United States Patent [19]

Harding

[11] Patent Number: 4,595,425

[45] Date of Patent: Jun. 17, 1986

[54] CORROSION INHIBITING QUENCHANT COMPOSITIONS

[75] Inventor: Ronald H. Harding, Westport, Conn.

[73] Assignee: Union Carbide Corporation, Danbury, Conn.

[21] Appl. No.: 717,545

[22] Filed: Mar. 29, 1985

[51] Int. Cl.$^4$ .................................................. C21D 1/56
[52] U.S. Cl. ..................................... 148/18; 148/20.6; 148/27; 252/76; 252/392
[58] Field of Search ................ 148/18, 20.6, 27; 252/76

[56] References Cited

U.S. PATENT DOCUMENTS

| | | | |
|---|---|---|---|
| 4,087,290 | 5/1978 | Kopietz | 148/18 |
| 4,263,167 | 4/1981 | Mago | 252/392 |
| 4,277,366 | 7/1981 | Mago | 252/392 |
| 4,324,675 | 4/1982 | Barthold et al. | 252/76 |
| 4,381,205 | 4/1983 | Warchol | 148/18 |
| 4,404,044 | 9/1983 | Warchol | 148/18 |
| 4,486,246 | 12/1984 | Warchol | 148/18 |

Primary Examiner—Veronica O'Keefe
Attorney, Agent, or Firm—J. B. Mauro

[57] ABSTRACT

An organic polymer containing composition suitable for use as a quenchant having incorporated therein a non-nitrite inhibitor system, which comprises an aromatic compound having at least one substituent nitro group and/or the water soluble organic or inorganic salt thereof and a hydroxy substituted mono aromatic carboxylic acid and/or the water soluble organic or inorganic salt thereof. In another embodiment a pH adjustment agent capable of providing an initial pH of at least 7.5 is also present.

31 Claims, No Drawings

CORROSION INHIBITING QUENCHANT COMPOSITIONS

BACKGROUND OF THE INVENTION

This invention relates to corrosion inhibiting organic polymer-containing quenchant compositions that provide excellent protection against the corrosion of steel.

Quenching is a process whereby a metal heated to a given elevated temperature is rapidly cooled by immersion in a bath containing a composition having a high heat extracting potential such as water, brines, oils or polymer solutions. Water and brine baths are easily disposed of and relatively inexpensive, however, such baths cool at extremely rapid rates and frequently provide metals quenched therein with a strained microstructure that is susceptible to warpage and cracking. Oil baths typically provide metals quenched therein with relatively slow cooling rates, however, oils are expensive materials to use, have relatively low flash points which create a risk of fire, and oftentimes leave an undesirable film on metals quenched therein.

Low cost aqueous solutions or dispersions of organic polymers have been developed which combine many of the cooling rate advantages of oils with the safety and disposal features of water and brine baths. Unlike oils which tend to form undesirable degradation products which are removed from tanks prior to bath replacement, organic polymer-containing quench baths generally do not form system-fouling products. Thus, these organic polymer-containing compositions are of particular interest. Accordingly, organic polymer-containing baths are easily maintained by the addition of quenchant concentrate to an existing bath.

Aqueous organic polymer-containing quenchant compositions, like any water containing compositions, have a tendency to corrode metals with which they are in contact. Moreover, at the elevated temperatures encountered when hot metals are rapidly cooled, many organic polymers tend to undergo thermal and oxidative degradation to form products, usually acids, which also contribute to corrosion. In order to impart protection against corrosion, one or more corrosion inhibitors are generally included in quenchant compositions. The ability of a corrosion inhibitor to protect against the corrosion of ferrous metals such as iron and steel is especially critical in the case of these compositions since quench tanks, quenchant agitation equipment and workpiece handling systems are typically fabricated from iron based metals.

Under conditions of normal usage, a quench bath gradually becomes depleted of its various components. Bath depletion may result, for example, from evaporation, boil over, and splash out loss of quenchant; polymer being dragged out of solution as a film on materials quenched; and oxidative and thermal degradation of polymer.

In the course of use, the fluid level of the bath is maintained at a predetermined volume by the addition of water, however, since polymer and inhibitor components may be selectively lost from a bath, the periodic addition of concentrated quenchant is necessary to maintain proper bath composition. Users are generally able to readily determine the polymer concentration of a bath by measuring the viscosity and/or refractive index of a bath sample. Analysis of a bath for its inhibitor concentration is typically not performed since it requires more expensive equipment and is more time consuming than polymer analysis.

Since concentrate addition is usually determined by polymer analysis, quenchant compositions are typically formulated to contain an amount of inhibitor in excess of the minimum amount needed to provide protection against corrosion. The safety margin afforded by the inhibitor excess ensures that adequate corrosion protection is not unknowingly lost.

Heretofore, alkali metal nitrites, such as sodium nitrite, have been widely used as inhibitor additives in quenchant compositions. Nitrites are particularly effective in inhibiting the corrosion of steel and from a cost perspective are relatively inexpensive. Amines, such as triethanolamines, are also well know corrosion inhibitors. While not normally used in conjunction with amines, nitrite inhibited quenchant composition are sometimes subject to amine contamination. The formation of N-nitrosamines by the reaction of secondary amines with nitrites may be possible. Therefore, considerable interest exists in developing a non-nitrite corrosion inhibitor system, most preferably an amine-free, non-nitrite corrosion inhibitor system, which may be compatibly added to existing nitrite containing baths without engendering N-nitrosamine formation, thus allowing users to run nitrite out of their baths while converting to non-nitrite systems.

Researchers have experimented with a variety of compositions in attempting to develop a non-nitrite inhibitor system which approximates nitrite performance with respect to inhibiting the corrosion of steel. European Patent Application No. 79236 discloses a nitrite-free quench bath comprising water, a polyalkylene glycol, triethanolamine, salicylic acid and a copper chelating agent. West German Pat. No. 1,811,591 discloses a quench bath comprising water, an ethanol amine, and a carboxylic acid such as benzoic or salicylic acid. Japanese Pat. No. 57-85923 discloses aqueous polyalkylene glycol metal-quenching fluids containing a mixture of a carboxylic acid, an amine and a chelating agent as a corrosion inhibitor.

U.S. Pat. No. 4,263,167 to B. Mago discloses poly(alkylene) oxide compositions suitable for use as hydraulic fluids, metal working lubricants, metal treating formulations, and the like. The compositions have incorporated therein a bridged dimer of a hydroxyl-substituted aromatic carboxylic acid and salts thereof of the general formula:

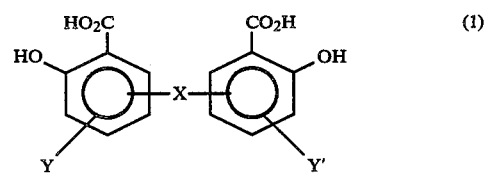

or

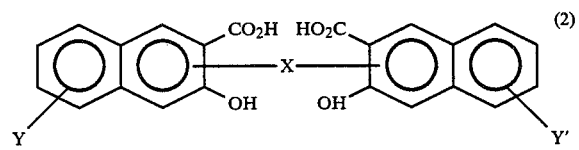

wherein X is a chemically stable group selected from lower alkylene, sulfonyl, and amino groups, and a sulfur atom, and Y and Y' may be the same or different, and are a hydrogen atom, hydroxyl group, amino group, alkyl group, or sulfonyl group.

U.S. Pat. No. 4,277,366 to B. Mago describes poly(alkylene oxide) compositions suitable for use as hydraulic fluids, metal working lubricants, metal treating formulations and the like having incorporated therein an effective amount of a mononuclear aromatic compound having at least one substituent nitro group such as nitrobenzoic acid, 4-nitrophthalic acid, 5-nitroisophthalic acid, 3,5-dinitrobenzoic acid and salts thereof. These compounds are excellent corrosion inhibitors but have the disadvantage of being relatively expensive.

European Pat. No. 0 039 488 issued to Mago et al. discloses poly(alkylene oxide) compositions suitable for use as hydraulic fluids, metal working, lubricants, metal treating formulations and the like having incorporated therein a corrosion inhibiting amount of a mixture comprising a mononuclear aromatic compound having at least one substituent nitro group, a precipitant anodic inhibitor, and preferably a buffer. Included among the precipitant anodic inhibitors suitable for use therein are bridged dimers of hydroxyl substituted aromatic carboxylic acids and salts thereof of the general formula:

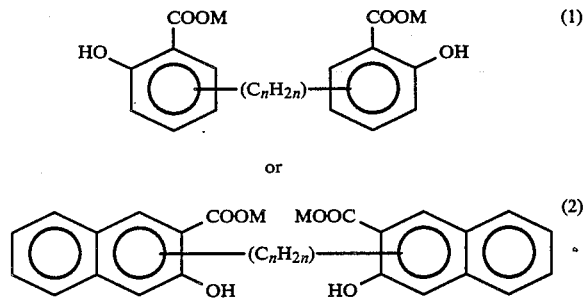

wherein n is an integer having a value from 1 to 4 and M is hydrogen or an alkali metal; non-oxidizing inorganic acids such as those of tungstic and molybdic acids; and benzoic acid or the soluble salts thereof.

Among the buffers listed as suitable for use therein are those buffers having a pH between about 8 and 10 such as borax and alkanolamines. The patent exemplifies as a suitable inhibitor system the combination of monoethanolamine, benzoic acid, and the sodium salt of m-nitrobenzoic acid (see Table I, Example 9).

The European patent to Mago et al. does not specifically disclose the use of salicyclic acid or the alkali metal salts thereof in combination with nitro-substituted monoaromatics. In fact, in U.S. Pat. No. 4,277,366 Mago discloses that salicylic acid salts and benzoic acid salts behave in different ways, and further, that salicylic acid salts are not effective corrosion inhibitors:

"The data thus presented show that nitroaromatic compounds exhibit considerable oxidation protection for the poly(alkylene oxide) solution and when suitable amounts of said additive were employed, offered good corrosion protection to steel. In contrast thereto sodium salicylate, which has a hydroxyl substituent on an aromatic acid nucleus, exhibited good oxidation protection but was not a good corrosion inhibitor for steel; sodium benzoate, which has no substituent on an aromatic acid nucleus, exhibited good corrosion inhibition for steel but afforded poor oxidation resistance . . . " (see column 5, line 47 to column 6, line 43).

U.S. Pat. No. 4,434,066 to Lewis discloses an aqueous composition suitable for use as a hydraulic energy transmitting fluid having a viscosity of at least 10 centistokes at 40° C. containing up to 80 percent by weight of water and having incorporated therein at least 0.1 percent of an acidic lubricating agent and an amount of an antiwear additive which is effective in enhancing the antiwear and lubricating characteristics of the composition. The antiwear additive disclosed is a combination of nitroaromatic compounds having at least one substituent nitro group, such as 3-nitrobenzoic acid, 3,5-dinitrobenzoic acid and the like, and a hydroxyl substituted aromatic carboxylic acid, such as salicylic acid, dihydroxy substituted benzoic acid and bridged dimers of the formula:

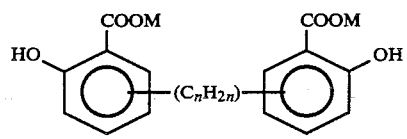

or

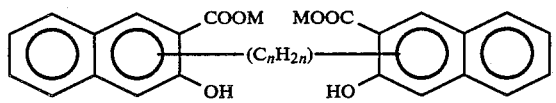

wherein M is hydrogen, alkali metal, alkaline earth metal or ammonium and n is an integer having a value of 1 to 4.

The patent further discloses that a water-soluble polymer viscosity control agent, such as a poly(alkylene oxide) polymer, polyalkyl methacrylate, urethane polymer, polyamide ester, or polyamide alkoxylate may also be present. Lewis specifically discloses the desirability of adding corrosion inhibitors to the composition in addition to the antiwear additive. Examples of corrosion inhibitors suitable for use in the composition are alkanolamines, alkylene oxide adducts, alkali metal salts of carboxylic acids and the like.

In accordance with the present invention there are provided aqueous polymer compositions suitable for use as quenchant compositions which provide excellent protection against the corrosion of metals, particularly steel, having incorporated therein non-nitrite inhibitor systems wherein the corrosion protection afforded by the corrosion inhibitor components of the systems is enhanced by the presence of potentiators. Further aspects of this invention are directed to inhibitor systems that are free from both amine and nitrite components and can thus be used in conjunction with quenchant concentrates for use in quenchant baths that contain nitrites. The invention is also directed to a method of quenching metals using the quenchant composition of this invention.

DEFINITIONS

For purposes of this description of the invention, the following definitions shall apply:

An "effective amount" of an inhibitor is that quantity of nitro-substituted compound which provides an organic polymer containing quenchant composition with a pre-acid wash corrosion weight change of about 1.0 mg. or less, as per a series of 576 repetitions of the Repeat Quench Test hereinafter detailed wherein the pH of the composition at the expiration of the test is a value of about 7.

The "minimum effective amount" of an inhibitor system is defined as the smallest quantity of nitro-substituted compound which consistently provides an organic polymer containing composition with a pre-acid wash corrosion weight change of 1.0 mg or less, as per a series of 576 repetitions of the Repeat Quench Test wherein the pH of the composition at the expiration of the test is a value of about 7.

A "potentiating amount" of potentiator is defined as that quantity of potentiator which is sufficient to reduce the "minimum effective amount" of nitro-substituted compound present in the composition to a value below the amount present in the "minimum effective amount" of an otherwise identical composition lacking a potentiator.

A "potentiatingly acceptable" compound is that hydroxy-substituted mononuclear aromatic carboxylic acid, or salt thereof, which by its addition to a composition reduces the "minimum effective amount" of the inhibitor component of the composition.

"Water soluble" is defined as having a solubility of at least 0.1 moles per liter of composition at 25° C.

The "Repeat Quench Test" is the following test: A weighed 1010 steel coupon 4.4 cm×0.08 cm×10.0 cm having a mass of about 26 gms is suspended in a 30 cm cylindrical tank 11 cm in diameter containing approximately 2500 ml of the quenchant composition being sampled so that ⅔ of the coupon is positioned below the bath surface. The temperature of the bath is maintained at about 43±5° C. by means of a water cooling jacket fitted to the tank. The tank is equipped with a mechanical circulating means to ensure continuous bath agitation and a foil cover to check bath evaporation. An 80 cm low carbon steel rod 15.9 mm in diameter is subjected to 5 minutes of heating in a 845° C. furnace located above the tank to reach a surface temperature of about 750° to 800° C. Following heating, the rod is immersed in the bath to a depth of about 20 cm for a 2½ minute period. The rod is continuously cycled between the furnace and bath for a series of 576 repetitions over a 72 hour period. A float-level control unit tied into a 4 liter reservoir of distilled water monitors the fluid level of the bath, maintaining same at a pre-set mark.

At the expiration of the testing period, the steel coupon is removed from the bath, rinsed, dried and weighed. The coupon is next subjected to washing with a 10% aqueous solution of hydrochloric acid containing about 0.2% by weight of an alkylpyridine to further remove oxidation products and is weighed again. The gain or loss in weight is reported in units of milligrams. Additionally the final pH value of the composition is measured and recorded.

SUMMARY OF THE INVENTION

This invention relates to an aqueous organic polymer containing composition suitable for use as a quenchant composition having incorporated therein a corrosion inhibitor system having as a corrosion inhibitor component (A), an "effective amount" of "water soluble" aromatic carboxylic acid or salt thereof having one or two aromatic rings and at least one nitro-substituent; and as a potentiator component (B), at least a "potentiating" amount of a "water soluble" compound of the formula:

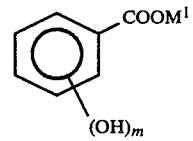

wherein $M^1$ is hydrogen or an organic or inorganic cation and m is 1 or 2.

Preferably the water soluble potentiator is provided in an amount sufficient to reduce the "minimum effect amount" of the inhibitor component (A) by at least 25 percent, most preferably by at least 40 percent, as compared to an otherwise identical composition lacking a potentiator component (B).

In a preferred embodiment the composition of this invention also comprises a pH adjustment agent.

DETAILED DESCRIPTION OF THE INVENTION

The nitro-substituted aromatic acids and salts include monoaromatic compounds of the formula:

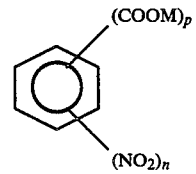

wherein M is hydrogen or an organic or inorganic cation and n and p are independently 1 or 2. Preferably, the corrosion inhibitor is selected from the group consisting of ortho, meta, and para-nitrobenzoic acid, 4-nitrophthalic acid, 5-nitroisophthalic acid, 3,5-dinitrobenzoic acid and the water soluble organic and inorganic salts thereof. Preferred salts are the alkali metal salts and, in the general case, the amine and alkanolamine salts of the nitro-substituted acids.

The potentiators include salicylic acid, 3,5-dihydroxy benzoic acid and the water soluble organic or inorganic salts thereof, particularly the alkali metal salts and, in the general case, the amine and alkanolamine salts thereof. It should be noted that the potentiator may be further substituted with one or more alkyl, alkoxy, or halide group(s) provided that such substitution does not reduce the solubility of the potentiator to a value below that which is defined herein as water soluble or provide a compound which is not "potentiatingly acceptable". Preferred potentiators are salicylic acid and the sodium and potassium salts thereof.

The pH adjustment agents include neutralizing agents and buffers which provide the composition with an initial pH value of at least about 7.5, and preferably provide an initial pH value between about 7.5 and 12.0. Buffers which maintain the pH value of the composition in use within a range of from about 7.0 to about 11.5 are preferred pH adjustment agents. The pH adjustment agent suitable for use herein should not reduce the solubility of the other components of the inhibitor system to a value less than that defined herein as "water soluble". Neutralizing agents and buffers include compounds such as alkali metal or ammonium hydroxides, phosphates, borates, bicarbonates or alkanolamines; borax and the like. Borax and alkanolamines, particularly triethanolamine which tends to be more stable in solution than alkanolamines such as ethanolamine and diethanolamine, are preferred. In compositions characterized by the essential absence of amine compounds, buffers may be selected from the group consisting of water soluble phosphates, borates, bicarbonates and borax.

The mole ratio of nitro-substituted aromatic compound to potentiator varies over a wide range. Once at least a "minimum effective amount" of an inhibitor component is provided to a composition, the concentration of either the nitro-substituted aromatic compound or potentiator oftentimes may be significantly increased without adversely affecting the corrosion inhibiting properties of the inhibitor system. In general, the mole ratio of nitro-substituted aromatic compound to potentiator ranges from about 1:10 to about 10:1, with cost factors making ratios of 1:2 to 2:1 the ratios of choice, with ratios of about 1:1.5 to about 1.5:1 being generally more desirable.

The organic polymers suitable for use in this invention are widely variable. In general, the polymers have a solubility of about 50.0 g/liter in water at 25° C. and average molecular weights of from about 400 to several million. The polymers include for example, poly(oxyalkylene) containing polymers, typical of which are the polymers present in the UCON ® quenchants available from Union Carbide Corporation; polyacrylic acids, polymethacrylic acids, copolymers of acrylic acid and methacrylic acid and the water-soluble salts thereof, including the sodium polyacrylates of Aqua-Quench ® 110 available from E. F. Houghton; polyvinylpyrrolidones such as are present in Parquench ® 60 or Parquench ® 90 available from Park Chemical Co.; polyoxazolines such as Developmental Polymer XAS-10874 a poly 2-ethyloxazoline polymer available from Dow Chemical Co.; polyvinyl alcohols and the like. Polymers selected from the group consisting of poly(oxyalkylene) containing polymers; acrylic acid polymers and copolymers, the alkali metal and ammonium salts of acrylic acid polymers and copolymers, polyvinylpyrrolidones, and polyoxazolines are preferred. Poly(oxyalkylene) containing polymers are particularly well suited for use in quenchant compositions.

Poly(oxyalkylene) containing polymers include those polymers having weight average molecular weights of from about 1,000 to about 25,000 with weight average molecular weights of from about 4,000 to about 20,000 being preferred and weight average molecular weights of about 10,000 to about 16,000 being especially preferred. For most quenchant applications copolymers having oxyethylene and higher molecular weight oxyalkylene groups are preferred. Particularly preferred are copolymers having oxyethylene and oxybutylene groups, and most preferably copolymers having oxyethylene and oxypropylene groups. Terpolymers containing oxyethylene, oxypropylene, and oxybutylene groups are also suitable for use herein. In general, the polymers should contain sufficient oxyethylene groups to render the polymer water soluble. Copolymers containing from about 60 to about 90 weight percent of oxyethylene groups and from about 40 to about 10 weight percent of higher molecular weight oxyalkylene groups are preferred. Copolymers containing from about 75 to 85 percent of oxyethylene groups and from about 25 to 15 percent of higher molecular weight oxyalkylene groups are particularly preferred. The polymers may be linear or branched; random or blocked, capped or uncapped. Branched polymers suitable for use herein include the connected branch copolymers disclosed in European Pat. No. 0 116 978 incorporated herein by reference. Polyoxyalkylene containing polymers suitable for use in the compositions of this invention are set forth more fully in U.S. Pat. Nos. 2,425,755, 2,770,564, 3,022,205, 3,475,232, 3,865,642, 4,277,366, and 4,310,436 incorporated herein by reference.

The polyvinylpyrrolidones include polymers represented by the formula:

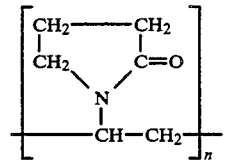

wherein n is an integer such as to provide a polymer with a molecular weight of about 5,000 to 400,000, preferably about 50,000 to about 360,000 and most preferably about 100,000 to 200,000. Polyvinylpyrrolidones suitable for use herein are set forth more particularly in U.S. Pat. No. 3,902,929 incorporated by reference herein.

The polyoxazoline polymers include polymers represented by the formula:

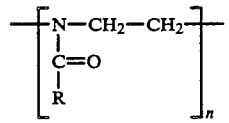

wherein R is a substituent selected from the group consisting of a phenyl group or an alkyl group having 1 to 7 carbon atoms, and is preferably an alkyl containing from 1 to 3 carbon atoms and wherein n is an integer, such as to provide a polymer having a molecular weight of about 5,000 to about 1,000,000, preferably about 50,000 to about 500,000 and most preferably about 200,000 to 500,000. Such polymers are described more particularly in U.S. Pat. No. 4,486,246 incorporated herein by reference.

The polyacrylic acid polymers include polyacrylic and polymethacrylic acids, copolymers of acrylic and methacrylic acid, and the organic or inorganic salts thereof having an intrinsic viscosity $[\eta]$ of about 0.010 to about 0.050 l/g, preferably about 0.020 to about 0.045 l/g, as determined in water at 25° C. These polymers are disclosed more particularly in U.S. Pat. No. 3,996,076, incorporated by reference herein. Preferred organic salts of the polyacrylic acids include the potassium, sodium, ammonium and alkanol salts thereof.

The polyvinyl alcohols include the hydrolysis products of polyvinyl esters of carboxylic acids as well as the hydrolysis products of copolymers of vinyl esters with polymerizable materials such as styrene, acrylic esters, acrylonitrile, vinyl halides, maleic anhydrides, vinylidene chloride, ethylene and the like as set forth more fully in U.S. Pat. No. 2,600,290 incorporated herein by reference.

The polymer concentrations of the compositions of this invention are widely variable. Depending upon the particular polymer used and the specific quenching application, the ratio of water to polymer may be between about 250:1 to 1:1. The range provided includes concentrates which have typical water to polymer ratios of about 20:1 to about 1:1. In the case of poly(oxyalkylene)-containing quenchant compositions, concentrations of from about 1% to about 20% by weight of polymer are typical with compositions of from about 2% to about 15% by weight of polymer being preferred. In the case of polyvinylpyrrolidone-containing compositions, concentrations of from about 1% to about 13% by weight of polymer are typical with concentrations of from about 2% to about 8% by weight being preferred. Polyoxazoline-containing quenchant compositions usually contain from about 0.5 to about 5.0% of polymer, with polymer concentrations of from about 1.5% to about 3.0% by weight being preferred. Polyacrylate or polyacrylic acid-containing compositions generally contain from about 0.4% to about 10.0% by weight, preferably from about 0.5% to about 6.0% by weight of polymer. The polymer concentration of polyvinyl alcohol-containing compositions is typically from about 0.1% to about 10% by weight, preferably from about 0.5% to about 3.0% by weight.

The minimum effective amount of a given inhibitor component in a composition varies depending upon the degree of nitro-substitution of the inhibitor, the particular polymer used, the polymer concentration, the amount of water present in the composition, and the conditions of use to which the composition is subjected. For example, when the pH of a composition in use falls to a value below about 7.0 it may be necessary to provide the composition with a greater concentration of inhibitor than if its pH in use had been maintained at a value above about 7.0. In general, compositions may contain from about 0.02 to about 2.0 weight percent, based on the total weight of the composition, of a corrosion inhibitor. Potentiator concentrations, like inhibitor concentrations, are widely variable. A typical "potentiating amount" of potentiator falls within a range of from about 0.02 to about 2.0 weight percent, based on the weight of the composition.

It should be noted that at inhibitor concentrations slightly less than the "minimum effective amount" corrosion weight change data is widely variable. The scatter observed for weight change data is increased when the final pH of the composition falls to values below about 7.0. The fluctuations in inhibitor system performance at acidic pH values together with the tendency of acidic compositions to increase corrosion make compositions capable of maintaining pH values above about 7.0 the compositions of choice for use as quenchant compositions.

Although effective protection against corrosion may be attained at relatively low inhibitor system concentrations, it is recommended that in use the concentrations be increased to ensure that adequate corrosion protection is maintained. Inhibitor concentrations from about 1.5 to about 10 times the "minimum effective amount" fall within a representative safety factor range. Inhibitor concentrations of at least three times the minimum "effective amount" are preferred. Economic factors will determine the inhibitor concentrations of choice, however, for most quenchant applications, inhibitor concentrations in a range between 3 and 4 times the "minimum effective amount" impart a sufficient safety factor to the composition.

The compositions of this invention may be prepared by adding the acid forms of the nitrosubstituted compound and potentiator to an aqueous organic polymer base. If a buffered organic inhibitor system is desired, an organic buffer such as an alkanolamine is additionally added to the composition. Preferably, compositions containing an organic buffer are prepared by dissolving a selected alkanolamine in water to form a base solution, sifting the desired acid forms of the inhibitor and potentiator into the base solution while continuously agitating the same, and adding a selected aqueous organic polymer component to the base solution following dissolution of the acids. In another embodiment the organic salts of the organic acids are formed in situ by the addition of a strong base, such as an alkali metal hydroxide, to the composition. Preferably, the inorganic salt forms of the compositions are prepared by dissolving the selected base in water to form a base solution, sifting the desired acid forms of the inhibitor and potentiator into the base solution while continuously agitating same, dissolving a buffer in the resulting solution if desired, and adding a selected organic polymer component thereto. In amine-free systems containing the salt forms of the organic acids, the composition may be buffered to a desired pH by the addition of phosphate, borate, bicarbonate, borax or the like.

In a preferred embodiment, this invention is directed to an aqueous composition comprising a poly(oxyalkylene)-containing polymer having sufficient ethylene oxide groups to provide a water solubility of at least about 50 grams per liter at 25° C., a nitrosubstituted aromatic acid acid of the formula:

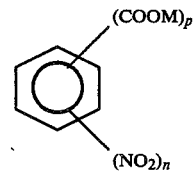

wherein M is hydrogen or an organic or inorganic cation and n and p are independently 1 or 2; a "potentiating amount" of a potentiator of the formula:

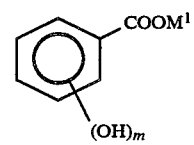

wherein $M^1$ is hydrogen or an inorganic cation; and m is 1 or 2; and a pH adjustment agent in an amount sufficient to provide an initial pH of at least about 7.5.

In an especially preferred embodiment this invention comprises an aqueous organic polymer containing composition having incorporated therein a corrosion inhibitor selected from the group consisting of ortho, meta, and para-nitrobenzoic acid, 4-nitrophthalic acid, 5-nitroisophthalic acid, 3,5-dinitrobenzoic acid and the organic or inorganic water soluble salts thereof and sufficient water soluble potentiator of the formula:

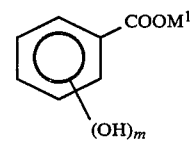

wherein $M^1$ is selected from the group consisting of hydrogen and organic and inorganic cations and m is 1 or 2, to provide a corrosion weight change of 1.0 mg. or less as per the Repeat Quench Test wherein the pH of the composition at the expiration of the test is a value of about 7, the mole ratio of inhibitor to potentiator being about 1:10 to about 10:1. Preferably, the composition also comprises as buffer capable of maintaining the pH value of the composition within a range of from about 7.0 to about 11.5.

This invention is also directed to a method of quenching metals which comprises the steps of
(A) heating a metal workpiece to a desired high temperature;
(B) immersing the metal in a bath comprising from about 0.5 to about 20 percent by weight of an organic polymer; from about 0.02 to about 2.0 weight percent of a water soluble aromatic carboxylic acid or salt thereof, having one or two aromatic rings and at least one nitro-substituent; from about 0.02 to about 2.0 weight percent of a water soluble monoaromatic carboxylic acid or salts thereof, having one or two hydroxy substituents; and a balance of water, until a desired reduction in workpiece temperature is achieved;
(C) removing the workpiece from the bath.

In a preferred method of quenching metals the bath is characterized as having an essential absence of amine compounds and comprises from about 2 to about 20 weight percent of an ethylene oxide/propylene oxide copolymer having from about 60 to about 90 weight percent of oxyethylene groups and from about 40 to about 10 percent of oxypropylene groups, from about 0.2 to about 2.0 weight percent of a corrosion inhibitor selected from the group consisting of nitro-benzoic acid, 3,5-dinitro benzoic acid and the alkali metal and salt thereof; from about 0.02 to about 2.0 weight percent of a potentiator selected from the group consisting of salicylic acid, 3,5-dihydroxy benzoic acid and the alkali metal and ammonium salts thereof, a buffer capable of maintaining the pH value of the composition in use within a range of from about 7.0 to about 11.5; and a balance of water.

EXAMPLES 1 TO 5, AND COMPARATIVE EXAMPLES

The corrosion resistance of various organic polymer containing compositions was studied by means of the following Repeat Quench Test. Corrosion data for the various solutions tested is provided in Table I below.

| Example | Polymer[4] | Water | Benzoic Acid | p-nitro Benzoic Acid | 3,5-di nitro Benzoic Acid | Salicylic Acid | Methylene disalicyclic Acid | Diethanol Amine | Triethanol Amine | NaOH | Before Acid Wash | After Acid Wash | pH |
|---|---|---|---|---|---|---|---|---|---|---|---|---|---|
| C1 | 10.00 | 89.87 | 0.10 | | | | | | | 0.03 | 4.8 | | 5.4 |
| C2 | 10.00 | 89.84 | | 0.13 | | | | | | 0.03 | 0.3 | | 5.7 |
| C3 | 10.00 | 89.86 | | | | 0.11 | | | | 0.03 | 17.9 | | 5.4 |
| C4 | 10.00 | 89.86 | 0.05 | 0.06 | | | | | | 0.03 | 0.9 | | 5.7 |
| 1[2] | 10.00 | 89.85 | | 0.06 | | 0.06 | | | | 0.03 | 1.0 | | 6.9 |
| C5 | 10.00 | 89.87 | | 0.10 | | | | 0.3 | | | 9.5 | 12.8 | 7.9 |
| C6 | 10.00 | 89.76 | | 0.20 | | | | 0.4 | | | 0.4 | 2.8 | 7.9 |
| 2 | 10.00 | 89.72 | | 0.12 | | 0.12 | | 0.4 | | | 0.1 | 2.3 | 7.5 |
| 3[3] | 10.00 | 89.68 | | 0.06 | | 0.06 | | | 0.20 | | 1.9 | | 7.2 |
| C7 | 10.00 | 89.68 | | | 0.06 | | 0.06 | | 0.20 | | 0.8 | 4.2 | 7.4 |
| C8 | 10.00 | 89.88 | | | 0.03 | | 0.03 | | .06 | | +3.9 | 22.2 | 7.4 |
| 4 | 10.00 | 89.88 | | .03 | | .03 | | | .06 | | 0.3 | 2.6 | 7.1 |
| 5 | 10.00 | 89.84 | | .03 | | .03 | | | .10 | | +.3 | 1.1 | 8.0 |

[1] Data values prefixed with an "+" indicates a weight gain as opposed to loss.
[2] A different run of the same inhibitor system wherein the pH dropped to a value of 6.0 produced a pre-acid wash corrosion weight loss of 14.3 mg.
[3] A different run of the same inhibitor system produced a corrosion weight loss of 1.2 mg before the acid wash, and 3.5 mg after the acid wash at a pH value of 7.3.
[4] The polymer of the compositions was a liquid water soluble random ethylene oxide/propylene oxide copolymer having an average of 75% by weight of oxyethylene groups and a Saybolt viscosity at 100° F. of 380,000.

What is claimed is:

1. An aqueous organic polymer containing composition having incorporated therein a corrosion inhibiting system which comprises:
   (A) an effective amount of a water-soluble aromatic carboxylic acid or salt thereof having one or two aromatic rings and at least one nitro substituent; and
   (B) at least a potentiating amount of a water soluble compound of the formula:

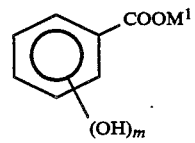

wherein $M^1$ is hydrogen or an organic or inorganic cation and m is 1 or 2.

2. The composition of claim 1 wherein component (B) is provided in an amount sufficient to reduce the "minimum effective amount" of component (A) by at least 25 percent.

3. The composition of claim 1 wherein component (A) is provided in a concentration at least three times the amount present in the "minimum effective amount".

4. The composition of claim 3 wherein from about 0.02 to 2.0 weight percent based on the weight of the composition of a corrosion inhibitor is provided.

5. The composition of claim 3 wherein the mole ratio of component (A) to component (B) is from about 1:10 to about 10:1.

6. The composition of claim 5 having a pH adjustment agent.

7. The composition of claim 7 wherein the pH adjustment agent comprises a buffer capable of maintaining the pH value of the compositions in use within a range of from about 7.0 to about 11.5.

8. The composition of claim 7 having an essential absence of amine compounds wherein the buffer comprises a member selected from the group consisting of water soluble phosphates, borates, bicarbonates and borax.

9. The composition of claim 1 in which the weight ratio of water to polymer is between about 250:1 to 1:1.

10. The composition of claim 1 in which the organic polymer is selected from the group consisting of poly(oxyalkylene)-containing polymers, acrylic acid polymers and copolymers, the alkali metal and ammonium salts of acrylic acid polymers and copolymers, polyvinylpyrrolidones and polyoxazolines.

11. The composition of claim 1 in which organic polymer is a poly(oxyalkylene)-containing polymer.

12. The composition of claim 11 wherein the polymer comprises a copolymer of ethylene oxide and propylene oxide.

13. The composition of claim 12 wherein the copolymer comprises from about 60 to about 90 percent by weight of oxyethylene groups and from about 40 to about 10 percent by weight of oxypropylene groups and has a molecular weight to from about 10,000 to about 16,000.

14. An aqueous composition useful as a metal quenchant comprising a water-soluble poly(oxyalkylene)-containing polymer having sufficient oxyethylene groups to provide a water solubility of at least about 50 grams per liter at 25° C.; a nitrosubstituted aromatic compound of the formula:

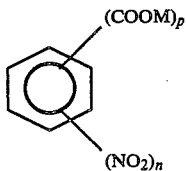

wherein M hydrogen and/or an organic or inorganic cation and n and p are independently 1 or 2; a potentiating amount of a potentiator of the formula:

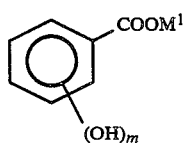

wherein $M^1$ is hydrogen or an organic or inorganic cation and m is 1 or 2; and a pH adjustment agent in an amount sufficient to provide an initial pH of at least about 7.5.

15. The composition of claim 14 wherein the nitro-substituted aromatic compound is provided in an amount of at least three times the amount present in the "minimum effective amount" of the inhibitor system.

16. The composition of claim 15 wherein the mole ratio of nitro-substituted aromatic compound to potentiator is about 1:10 to 10:1.

17. The composition of claim 16 wherein the nitro-substituted aromatic compound is provided in an amount of between about 0.02 to 2.0 weight percent based on the weight of the composition.

18. The composition of claim 17 wherein the copolymer comprises from about 60 to about 90 percent by weight of oxyethylene groups and from about 40 to about 10 percent by weight of oxypropylene groups and has a molecular weight of from about 10,000 to about 16,000.

19. An aqueous organic polymer containing composition having incorporated therein a corrosion inhibitor selected from the group consisting of ortho, meta-, and para-nitrobenzoic acid, 4-nitrophthalic acid, 5-nitroisophthalic acid, 3,5-dinitrobenzoic acid and the alkali metal and the organic or inorganic water soluble salts thereof and sufficient water-soluble potentiator of the formula:

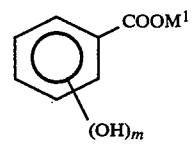

wherein $M^1$ is selected from the group consisting of hydrogen and organic or inorganic cations and m is 1 or 2, to provide a pre-acid wash corrosion weight change of 1.0 mg or less as per the Repeat Quench Test wherein the pH of the composition at the expiration of the test is a value of about 7, the mole ratio of inhibitor to potentiator being about 1:10 to about 10:1.

20. The composition of claim 19 wherein the polymer contains sufficient (oxyethylene) groups to have a water solubility of at least about 50 gram per liter of water at 20° C.

21. The composition of claim 20 wherein the pH adjustment agent comprises a buffer capable of maintaining the pH value of the composition in use within a range of about 7.0 to about 11.5.

22. The composition of claim 21 having an essential absence of amine compounds wherein the buffer comprises a member selected from the group consisting of water soluble phosphates, borates, bicarbonates and borax.

23. The composition of claim 22 wherein the corrosion inhibitor is an alkali metal salt of benzoic acid.

24. The composition of claim 19 in which the polymer is a copolymer of ethylene oxide and propylene oxide.

25. The composition of claim 23 in which the polymer is a block copolymer.

26. The composition of claim 19 in which the polymer is a random copolymer.

27. An aqueous quenchant composition having an essential absence of amine compounds which comprises from about 0.5 to about 20 percent by weight based on the total weight of the composition of an organic polymer; from about 0.02 to about 2.0 percent by weight based on the total weight of the composition of a water soluble aromatic carboxylic acid or salt thereof, having one or two aromatic rings and at least one nitro substituent; from about 0.02 and 2.0 percent by weight, based on the weight of the composition of a water soluble monoaromatic carboxylic acid or salt thereof, having one or two hydroxy substituents; and a balance of water.

28. The composition of claim 27 which also comprises a buffer capable of maintaining the pH value of the composition in use within a range of from about 7.0 to about 11.5.

29. The composition of claim 28 wherein the organic polymer is selected from the group consisting of poly(oxalkylene)-containing polymers; acrylic acid polymers and copolymers and the alkali metal and ammonium salts of acrylic acid polymers and copolymers, polyvinyl pyrrolidones, polyoxazoline, and polyvinylalcohols.

30. A method of quenching which comprises the steps of
(A) heating a metal workpiece to a desired high temperature,
(B) Immersing the metal in a bath comprising the composition of claim 27 until a desired reduction in workpiece temperature is achieved,
(C) removing the workpiece from the bath.

31. The method of claim 30 wherein the organic polymer of the bath is an alkylene oxide containing polymer and the bath also comprises sufficient buffer to maintain the pH value of the composition in use in a range of from about 7.0 to about 11.5.

* * * * *